Aug. 11, 1931.  J. S. DA COSTA  1,817,970
DRIVING MEANS FOR CONVEYER CHAINS
Filed Nov. 26, 1929  2 Sheets-Sheet 2

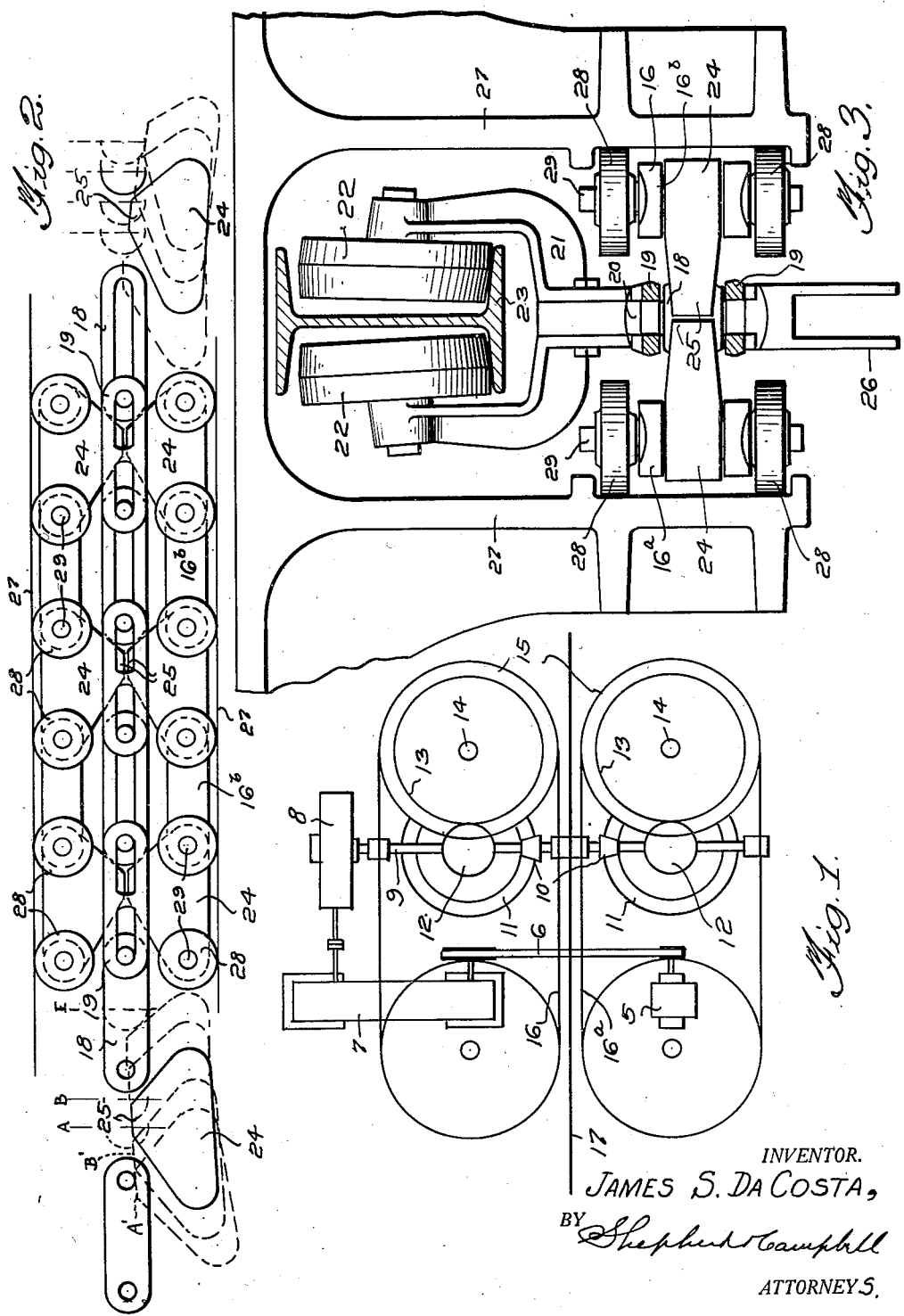

INVENTOR.
JAMES S. DaCosta,
BY
ATTORNEYS

Patented Aug. 11, 1931

1,817,970

UNITED STATES PATENT OFFICE

JAMES STARR DA COSTA, OF MERCHANTVILLE, NEW JERSEY, ASSIGNOR OF ONE-HALF TO JERVIS B. WEBB, OF DETROIT, MICHIGAN

DRIVING MEANS FOR CONVEYER CHAINS

Application filed November 26, 1929. Serial No. 409,930.

This invention relates to driving means for conveyer chains, and more particularly to what is commonly known as a caterpillar drive. In some installations the load upon a conveyer chain is so great that it has been found to be desirable to substitute for the ordinary driving sprocket wheels, a driving chain traveling in parallelism with the main conveyer chain for any desired distance, and carrying lugs which engage in the links of the main conveyer chain for the purpose of imparting movement thereto, and it is to mechanism of this character that the present invention relates.

In the accompanying drawings,

Fig. 1 is a diagrammatic view illustrating the relationship between the main conveyer chain and the caterpillar drive chains, hereinafter described.

Fig. 2 is an enlarged view of a portion of the caterpillar drive of the present invention, Fig. 3 is a detail cross-sectional view illustrating the manner in which the lugs of the caterpillar chains complementally engage the conveyer chain.

Like numerals designate corresponding parts in all of the figures of the drawings.

Figures 4, 5:
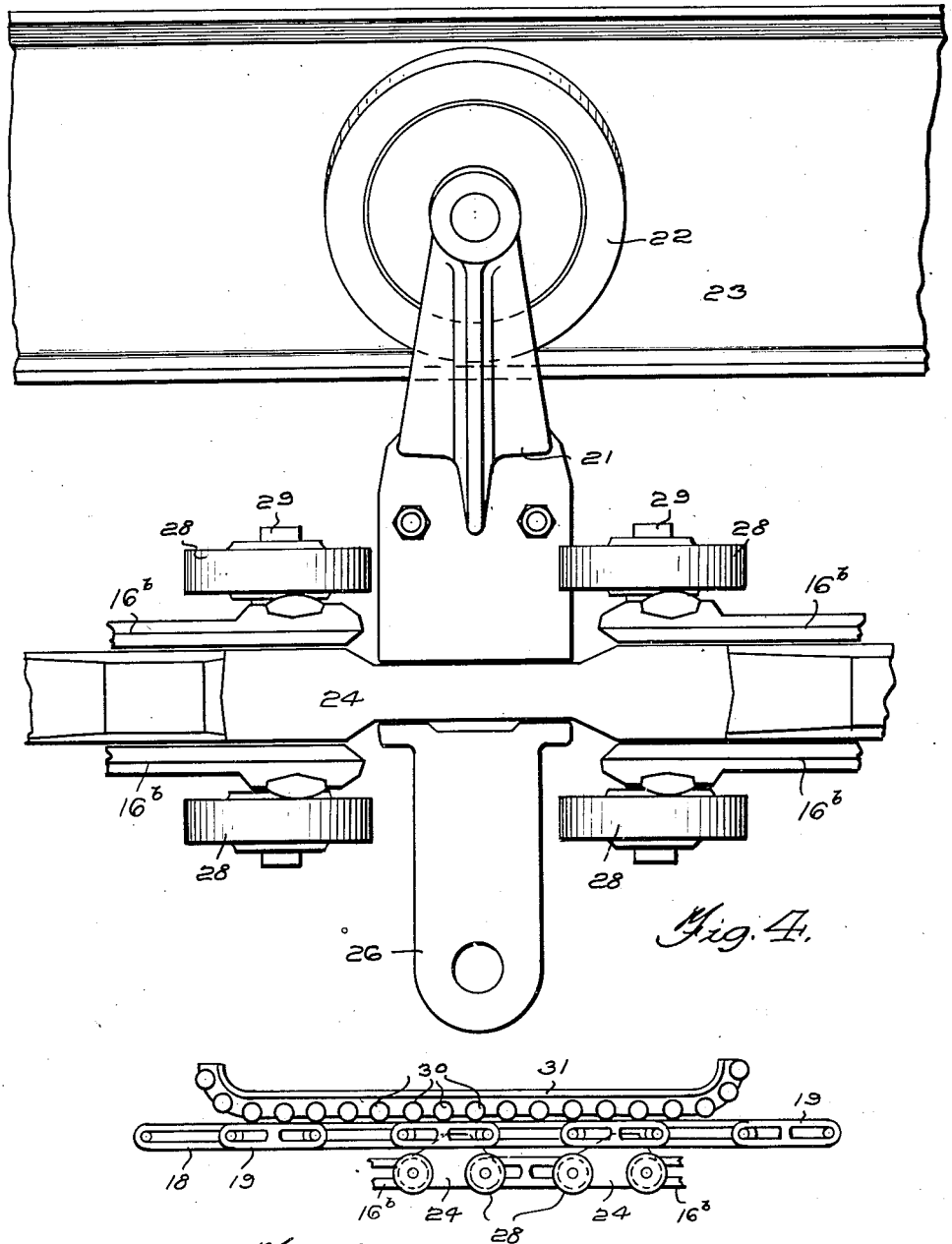
Fig. 4 is a fragmentary side elevation of the structure of Fig. 3.
Fig. 5 is a view illustrating a modified form of the invention.

Referring to the drawings, and more particularly to the diagrammatic Fig. 1, 5 designates an electric motor, or other suitable prime mover, which drives through sprocket mechanism 6, change speed gearing 7, a worm drive mechanism 8 to a transverse shaft 9. This shaft carries bevel pinions 10, which drive bevel gear wheels 11, and these gear wheels are on shafts which carry pinions 12. The latter mesh with gear wheels 13, on shafts 14, and these shafts carry caterpillar drive sprockets 15, through which motion is imparted to the caterpillar drive chains 16—16ª. These caterpillar drive chains are disposed upon the opposite sides of, or above and below, the conveyer chain 17, that is to be driven.

A form of chain conveyer that is very popular, and is widely used, is illustrated in Figs. 3 and 4, and comprises a chain consisting of the center links 18, side links 19 and connecting pins 20. This chain is supported by hangers 21, from trolley wheels 22, the latter traveling upon a trackway 23 that is commonly in the form of an I-beam.

In the particular form of the invention that I have chosen for purposes of illustration, the caterpillar chains 16—16ª are somewhat similar in construction to the main conveyer chain, in that they comprise the side links 16ᵇ and center links 24. However, they differ from the conveyer chain in that these center links are of a very peculiar and novel construction. These center links are extended laterally beyond the line of the chain to constitute transversely projected lugs 25, the lugs of the two caterpillar drive chains being adapted to complementally enter between the side links of the main conveyer chain and engage and thrust against the ends of the center links of said main chain to impart movement thereto for the purpose of conducting articles suspended from hangers 26, of the main chain, from place to place, as occasion requires.

An important feature of novelty and advantage in the present construction resides in the fact that the front faces of the lugs are so shaped and said lugs are disposed at such a point rearwardly of the pivotal connection between the links by which they are carried and the side links next in advance thereof, that the lugs are caused to engage with the main conveyer chain without any rubbing or frictional action, and are caused to leave said main conveying chain in the same way. That is to say, when the forward faces of the lugs engage the rear ends of the center links to begin the driving action, they move directly into contact therewith by a straight line movement, in the direction of engagement, and when they cease contacting with the rear ends of said links at the completion of the driving movement, they leave abruptly, and without any intermediate rubbing or sliding action whatever.

This is accomplished by shaping the forward faces of the lug forming links upon substantially the angle illustrated in Fig. 2, and by so proportioning the parts that the point of engagement between the forward faces of the lugs and the rear ends of the center links of the main chain, is disposed a material distance rearwardly of the point of connection between the lug forming link and the side links next in advance thereof. At the left hand end of Fig. 1, I have illustrated, in several dotted line positions, the movement of one of the lugs in coming into engagement with the rear end of one of the center links. Note that the movement of the lug into engagement with the rear ends of the links is under the influence of the movement of two points, viz: the front and rear connecting pins 29. As the rear pin 29 rises it rocks the lug upon the fulcrum constituted by its front pin support and in so doing rocks the lug into contact with the rear end of the link 18 next in advance thereof, contacting movement being in a straight line and without any rubbing or sliding action between the parts. The action differs from that which takes place between the teeth of ordinary sprocket wheels and the chains which they engage in that in the latter the said teeth move from a single point of support while in my construction the teeth are supported from two points, viz., the rearmost pin which is rising faster than the foremost pin and rocks the lug as a whole upon the fulcrum constituted by the foremost pin, into engagement with the rear end of the link in advance thereof. This action is facilitated by the fact that there are so many of the lugs pushing the conveyer chain along that the lug that is coming into action is not required to do any propulsive work until it has been rocked directly and firmly into engagement with the link that it is to engage. The reverse action takes place at the completion of the driving action of any given lug. That is to say, when the forward end of the lug dips downwardly and away from the line of travel of the main chain, as it starts around its sprocket wheel, it moves positively and immediately out of any engagement whatever with the main chain. In order to hold the adjacent runs of the caterpillar chains against outward movement, away from the main drive chain, during the time that the driving action is taking place, I back these runs of the caterpillar drive chains up by suitable supporting walls 27, which constitute trackways for rollers 28, which may be mounted upon the connecting pins 29 by which the center links 24 are connected to the side links 16.

In the form of the invention illustrated in Fig. 5, only one caterpillar drive chain is employed, the main drive chain being backed up on the other side by engaging with anti-friction rollers 30, that are carried by a backing-up bar 31.

As far as I am aware, I am the first to drive a main conveyer chain by a pair of caterpillar chains disposed upon opposite sides of the main conveyer chain, and provided with lugs complementally engaging said main chain, and this irrespective of the particular type of lug employed. Further, I believe that I am the first to employ a driving element for a main conveyer chain, which engages with and lets go of the main conveyer chain without any rubbing or sliding action between the parts, and this irrespective of whether two caterpillar chains are employed, as in Fig. 1, or whether only one caterpillar chain is employed, as in Fig. 5. While I prefer to have the driving lugs engage the rear ends of the center links of the main chain, it is to be understood that the invention contemplates the use of lugs shaped to engage in any practical way with the main chain.

Consequently, it is to be understood that the invention is not limited to the particular arrangement of parts shown in the accompanying drawings, nor to the particular type of main chain conveyer there illustrated, but that, upon the contrary, it includes within its purview whatever changes fairly come within either the terms or the spirit of the appended claims.

Having described my invention, what I claim is:

1. The combination with a main conveyer chain to be driven, of a pair of caterpillar drive chains, one upon each side of the main conveyer chain, each caterpillar drive chain having lugs complementally engaging and driving the main chain.

2. A structure as recited in claim 1, in combination with means for driving the caterpillar drive chains in unison.

3. A structure as recited in claim 1, in combination with means for driving the caterpillar drive chains in unison and at varying rates of speed.

4. A structure as recited in claim 1, in combination with a common motor and a change speed gearing between the motor and the two caterpillar drive chains that is common to both of said drive chains.

5. A structure as recited in claim 1, wherein the lugs are so shaped and the proportions of the parts are such that the lugs are moved into engagement with the drive chain by a contacting movement in a straight line, in the direction of the driving thrust, so that rubbing contact between the lugs and the driven chain is avoided.

6. The combination with a chain to be driven, of a movable driving chain and a lug projecting from the driving chain into position to engage the chain that is to be driven, said lug having its engaging face so shaped and disposed in such relation to the part of the driven chain that it engages, that it is moved into engagement with said chain in a straight line movement in the direction of thrust whereby any rubbing or sliding action between these parts is avoided.

7. The combination with a chain to be driven, of a movable driving chain and a lug projecting from the driving chain into position to engage the chain that is to be driven, said lug having its engaging face so shaped and disposed in such relation to the part of the driven chain that it engages, that it is moved into engagement with said chain in a straight line movement in the direction of thrust, whereby any rubbing or sliding action between these parts is avoided, and wherein the lugs at the moment of disengagement of the same from the driven chain are moved directly away from the driven chain without rubbing or sliding action.

8. The combination with a conveyer chain to be driven, comprising center links and side links and transverse connecting pins, of a driving chain mounted to travel in substantial parallelism with the driven conveyer chain through a portion of the travel of the latter, said driving chain comprising center and side links, and transversely projecting lugs which are adapted to engage portions of the conveyer chain to exert a driving thrust thereon, the position of the pivotal connections between the links of the two chains and the shape of the forward faces of the lugs, and the positioning of the forward faces of the lugs being such that said lugs are moved into engagement with the conveyer chain by a direct movement in the direction of thrust whereby sliding and rubbing engagement between the parts is prevented.

9. The combination with a conveyer chain to be driven, comprising center links and side links and transverse connecting pins, of a driving chain mounted to travel in substantial parallelism with the driven conveyer chain through a portion of the travel of the latter, said driving chain comprising center and side links, and transversely projecting lugs which are adapted to engage portions of the conveyer chain to exert a driving thrust thereon, the position of the pivotal connections between the links of the two chains and the shape of the forward faces of the lugs, and the positioning of the forward faces of the lugs being such that said lugs are moved into engagement with the conveyer chain by a direct movement in the direction of thrust whereby sliding and rubbing engagement between the parts is prevented, and wherein in the disengaging movement of the forward faces of the lugs from the conveyer chain, said lugs are moved in such direction that sliding and rubbing action at the moment of disengagement is prevented.

10. The combination with a main conveyer chain and a trackway from which said conveyer chain is suspended, of backing walls associated with said trackway, a pair of caterpillar drive chains lying upon opposite sides of the main conveyer chain and between the latter and said walls and comprising anti-friction devices which travel along said walls, and lugs which complementally engage the main chain.

11. The combination with a main conveyer chain, and its supporting trackway, of backing-up walls upon opposite sides of the main conveyer chain, a caterpillar drive chain upon each side of the main conveyer chain, said caterpillar drive chains comprising side links and center links and transverse connecting pins for connecting said links, anti-friction devices carried by said pins, traveling along said backing-up walls, and lugs projecting from the center links of the caterpillar drive chains into engagement with the main conveyer chain, as and for the purposes set forth.

12. A structure as recited in chain 11, wherein said lugs present forward faces that are rearwardly inclined and the contacting points of which lie rearwardly of the points of pivotal engagement of the lug carrying links with the side links of the caterpillar chains.

13. The combination with a main conveyer chain to be driven, of a caterpillar drive chain comprising side and center links connected by transverse connecting pins and driving lugs each having pivotal engagement at its opposite ends with a pair of said connecting pins, said lugs engaging a portion of the main conveyer chain to thrust thereagainst in the driving action.

14. A structure as recited in claim 13, wherein said lugs have rearwardly inclined front faces for the purposes set forth.

In testimony whereof I affix my signature.

JAMES STARR DA COSTA.